(12) United States Patent
Kram et al.

(10) Patent No.: US 12,601,388 B2
(45) Date of Patent: Apr. 14, 2026

(54) TORQUE TRANSMISSION DEVICE

(71) Applicant: ZF FRIEDRICHSHAFEN AG, Friedrichshafen (DE)

(72) Inventors: Matthias Kram, Nordheim am Main (DE); Mathias Kopp, Bamberg (DE); Armin Stürmer, Rannungen (DE); Andreas Orlamünder, Schonungen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 408 days.

(21) Appl. No.: 18/035,976

(22) PCT Filed: Nov. 5, 2021

(86) PCT No.: PCT/EP2021/080718
§ 371 (c)(1),
(2) Date: May 9, 2023

(87) PCT Pub. No.: WO2022/101093
PCT Pub. Date: May 19, 2022

(65) Prior Publication Data
US 2023/0417304 A1 Dec. 28, 2023

(30) Foreign Application Priority Data
Nov. 10, 2020 (DE) ..................... 10 2020 214 062.6

(51) Int. Cl.
*F16F 15/14* (2006.01)
*F16H 45/02* (2006.01)

(52) U.S. Cl.
CPC ........ *F16F 15/145* (2013.01); *F16F 2222/08* (2013.01); *F16F 2228/001* (2013.01);
(Continued)

(58) Field of Classification Search
CPC ................. F16F 15/145; F16F 2222/08; F16F 2228/001; F16F 2228/066; F16F 2232/02;
(Continued)

(56) References Cited

U.S. PATENT DOCUMENTS 8,161,740 B2 * 4/2012 Krause .................. F16F 15/145
60/338
10,309,484 B2 * 6/2019 Verhoog ............... F16F 15/145
(Continued)

FOREIGN PATENT DOCUMENTS

DE 19911561 9/2000
DE 112015000246 9/2016
(Continued)

OTHER PUBLICATIONS

Office Action of corresponding German Patent Application No. 10 2020 214 062.6.

*Primary Examiner* — Thomas J Williams
(74) *Attorney, Agent, or Firm* — COZEN O'CONNOR

(57) ABSTRACT

A torque transmission device including a speed-adaptive vibration absorber having an absorber mass that is arranged inside a housing, which is at least partially filled with a working medium. The vibration absorber is designed to compensate for vibration angle-independent and vibration angle-dependent damping effects by the working medium in the operating state.

5 Claims, 3 Drawing Sheets

(52) U.S. Cl.
     CPC ..... *F16F 2228/066* (2013.01); *F16F 2232/02*
     (2013.01); *F16H 45/02* (2013.01); *F16H*
     *2045/0263* (2013.01)

(58) Field of Classification Search
     CPC ............ F16H 45/02; F16H 2045/0263; F16H
     2045/021; F16H 2045/0284
     See application file for complete search history.

(56) References Cited

U.S. PATENT DOCUMENTS

| | | | | |
|---|---|---|---|---|
| 2017/0037929 A1 * | 2/2017 | Takikawa | ............... | F16F 15/145 |
| 2018/0187744 A1 * | 7/2018 | Takikawa | ............ | F16F 15/1471 |
| 2018/0372182 A1 * | 12/2018 | Takikawa | ............... | F16F 15/134 |
| 2019/0003554 A1 * | 1/2019 | Nagai | ................... | F16F 15/145 |
| 2019/0024752 A1 * | 1/2019 | Oi | ......................... | F16F 15/145 |
| 2019/0226552 A1 * | 7/2019 | Oi | ........................... | F16H 45/02 |
| 2023/0417304 A1 * | 12/2023 | Kram | .................... | F16F 15/145 |

FOREIGN PATENT DOCUMENTS

| | | |
|---|---|---|
| DE | 102016222468 | 5/2018 |
| WO | WO 2009067988 | 6/2009 |
| WO | WO 2014009112 | 1/2014 |
| WO | WO 2016026494 | 2/2016 |
| WO | WO 2019223831 | 11/2019 |

* cited by examiner

TORQUE TRANSMISSION DEVICE

CROSS REFERENCE TO RELATED APPLICATIONS

This is a U.S. national stage of Application No. PCT/EP2021/080718 filed Nov. 5, 2021. Priority is claimed on German Application No. DE 10 2020 214 062.6 filed Nov. 10, 2020 the content of which is incorporated herein by reference.

BACKGROUND OF THE INVENTION

1. Field of the Invention

The disclosure relates to a torque transmission device, in particular a torque transmission device for a motor vehicle.

2. Description of the Related Art

In the prior art, torque transmission devices having a speed-adaptive vibration absorber that works in an operating medium are known. Such torque transmission devices have a housing in which the speed-adaptive vibration absorber is arranged and are at least partially filled with an operating medium, in particular an oil. In the operating state, the torque transmission device and accordingly also the housing and the vibration absorber carry out a rotational movement. As a result, the operating medium is thrown radially outward. The absorber masses, which are arranged radially at the outer side, therefore carry out a relative movement with respect to the operating medium. When the operating medium is displaced by the absorber masses, the speed-adaptive vibration absorber is influenced. As a result of the movement within the operating medium, the absorber masses are subjected to a shearing action and a lifting action. This leads to an absorption magnitude of the speed-adaptive vibration absorber decreasing when operating with an operating medium compared with operation in the dry state, that is to say, without any operating medium. As a result, the effectiveness for damping occurrences of irregular rotation of an internal combustion engine is reduced. The speed-adaptive vibration absorber is accordingly for operating in the dry state, that is to say, without operating medium, adapted to a magnitude of absorption which is higher than is provided for the application. In the wet operating state, the vibration absorber then has the correct magnitude of absorption. The known effects of shearing action and lifting action provide in this instance a constant displacement of the magnitude of absorption.

During tests, it has been found that in addition to these constant damping effects, under specific conditions vibration-angle-dependent damping effects also occur. This is particularly the case with very tight spatial relationships on the absorber masses. In particular, there is very little space available for the displacement of the operating medium. These vibration-angle-dependent damping effects are in addition also dependent on the absorption magnitude of the absorber masses and consequently also on the oscillation speed of the absorber masses in a circumferential direction. The vibration-angle-dependent damping effects with a speed-adaptive vibration absorber with a low absorption magnitude are greater than with a speed-adaptive vibration absorbers with a high absorption magnitude.

SUMMARY OF THE INVENTION

An object of one aspect of the invention is a torque transmission device that provides an optimum absorption effect even in the event of vibration-angle-dependent damping effects.

The torque transmission device is suitable for a motor vehicle. In particular, the torque transmission device is provided for arrangement in a drive train of a motor vehicle. The torque transmission device is advantageously constructed between a drive, in particular an internal combustion engine, and gear mechanism.

The torque transmission device comprises a speed-adaptive vibration absorber having an absorber mass which is arranged inside a housing. The housing surrounds the speed-adaptive vibration absorber preferably in a fluid-tight manner. In particular, the housing carries out a rotational movement during operation of the torque transmission device. Advantageously, the speed-adaptive vibration absorber is secured directly or indirectly to the housing. Advantageously, the speed-adaptive vibration absorber is secured to the housing by a torsion damper and/or a torque converter. The speed-adaptive vibration absorber preferably comprises a plurality of absorber masses. The absorber masses are advantageously arranged on an absorber carrier. The absorber carrier is advantageously constructed in one or more pieces. Advantageously, the absorber mass is arranged axially at both sides of the absorber carrier or axially between a plurality of absorber carrier sheets of the absorber carrier. The absorber mass carries out a speed-dependent oscillating movement in a circumferential direction and eradicates occurrences of irregular rotation of the drive.

The housing is further at least partially filled with an operating medium. The operating medium is advantageously formed by an oil, in particular a gear oil.

Furthermore, the speed-adaptive vibration absorber is configured to compensate for vibration-angle-independent and vibration-angle-dependent damping effects as a result of the operating medium in the operating state. As already explained in the introductory portions of the description, under specific conditions in addition to the previously known vibration-angle-independent damping effects vibration-angle-dependent damping effects also occur. The speed-adaptive vibration absorber is accordingly configured in such a manner that the vibration-angle-dependent damping effects and vibration-angle-independent damping effects which occur as a result of the operating medium are compensated for so that, when operating with an operating medium, an optimum absorption of occurrences of irregular rotation is provided. The vibration-angle-dependent absorption magnitude of the vibration absorber consequently differs from a dry operating state, in which no operating medium is used, compared with a wet operating medium by a vibration-angle-independent magnitude displacement in the form of a constant absorption magnitude displacement and by a vibration-angle-dependent absorption magnitude displacement. A possible selection of an optimum absorption magnitude is further explained with reference to the advantageous variants. Generally, an optimum absorption magnitude in the wet operating state extends as close as possible to the excitation magnitude of the drive and remains almost unchanged over a majority of the entire vibration angle range. An optimum absorption of the excitations is thereby achieved.

In particular, such vibration-angle-dependent damping effects occur with tight spatial relationships, in which for the displacement of the operating medium only very little space is provided. These vibration-angle-dependent damping effects are with comparable spatial relationships for speed-adaptive vibration absorbers with a low absorption magnitude more powerful than for speed-adaptive vibration absorbers with a higher absorption magnitude.

In a particularly advantageous manner, the torque transmission device has a speed converter. Such a speed converter advantageously has a turbine wheel, a guide wheel and a pump wheel. These wheels are constructed in order via an operating medium to provide a force transmission between the drive and the gear mechanism.

In a particularly advantageous manner, the pump wheel of the torque converter forms a portion of the housing. In a particularly advantageous manner, the torque transmission device additionally has a bridge coupling. The bridge coupling bridges the torque converter, generally after the start-up operation of the motor vehicle has been completed. Preferably, the torque transmission device comprises no, one, two or more torsion dampers. The turbine wheel is in a particularly advantageous manner connected with respect to the force path in front of the torsion dampers, after the torsion dampers or between the two torsion dampers. In a further advantageous manner, the vibration absorber is also connected with respect to the force path in front of the torsion dampers, after the torsion dampers or between the two torsion dampers.

Advantageous variants of the torque transmission device will be explained below.

It is proposed that the vibration absorber during operation without operating medium have an absorption magnitude $q_t(\varphi)$ which is dependent on the vibration angle of the absorber mass and during operation with operating medium have an absorption magnitude $q_b(\varphi)$, wherein $q_t(\varphi)$ and $q_b(\varphi)$ differ by an absorption magnitude displacement which is independent of the vibration angle and an absorption magnitude displacement which is dependent on the vibration angle.

The absorption magnitude $q_b(\varphi)$ is during operation with operating medium constant over the majority of the vibration angle and preferably adapted toward the maximum vibration angle.

It is further proposed that $q_b(\varphi)=q_t(\varphi)-q_{su}-q_{sa}(\varphi)$ applies, wherein $q_{su}$ is constant and $q_{sa}(\varphi)$ is a function which is dependent on the vibration angle of the absorber mass.

$q_{su}$ provides in this instance the absorption magnitude displacement from the dry operating state to the wet operating state for vibration-angle-independent damping effects. $q_{su}$ is substantially constant. $q_{sa}(\varphi)$ provides the change of the absorption magnitude from the dry operating state to the wet operating state for vibration-angle-dependent damping effects. $q_{sa}(\varphi)$ is dependent on the vibration angle of the absorber mass. $q_{sa}(\varphi)$ is a function which increases in a substantially linear manner with the vibration angle. The term "substantially" means in this instance that the function extends along this straight line and can deviate in this instance to a limited extent with respect to the straight line in an upward or downward direction. In other words, $q_{sa}(\varphi)$ is formed by an on average linear function. In particular, $q_{sa}(\varphi)$ is a monotonous function, an on average monotonous function and/or a function which increases in a uniform manner with respect to the vibration angle. In other words, $q_{su}$ and $q_{sa}(\varphi)$ decreases the magnitude of absorption $q_t(\varphi)$ of the dry vibration absorber when operating with operating medium.

In a particularly advantageous manner, the vibration absorber provides a substantially constant absorption magnitude in the operating state with operating medium over at least a portion, in particular over a majority, of the entire vibration angle of the absorber mass.

This absorption of a uniform magnitude relates to the absorber in the operating state and in operating medium. An optimum absorption of occurrences of irregular rotation is thereby provided over a large vibration angle range. In other words, the absorption magnitude of the vibration absorber in the wet operating state is over a portion, in particular over a majority, substantially constant or on average constant. Accordingly, the absorption magnitude may move within specific limits around the linear mean value.

In a particularly advantageous manner, the absorption magnitude is displaced with respect to the excitation magnitude, in particular by a value from 0.01 to 0.5.

Depending on the configuration of the drive train, the torque transmission device and the speed-adaptive vibration absorber, the absorption magnitude of the vibration absorber may be selected to be above or below the excitation magnitude of the drive. The excitation magnitude is dependent on the number of actively operated cylinders. A four cylinder arrangement provides, for example, an excitation magnitude of 2, a six cylinder arrangement provides an excitation magnitude of 3. As a result of this slight displacement of the absorption magnitude with respect to the excitation magnitude, an operation within the resonance is prevented but nonetheless an optimum absorption of the occurrences of irregular rotation is provided. An operation of the vibration absorber on the resonance would destroy the vibration absorber in a short period of time as a result of the extremely powerful excitation. A lower limit for the configuration displacement with respect to the excitation magnitude is 0.01; 0.02; 0.03 or 0.04. An upper limit for the displacement of the absorption magnitude with respect to the excitation magnitude is 0.4; 0.3; 0.25; 0.2; 0.15; 0.13; 0.12; 0.11 or 0.1. Particularly advantageous ranges within which a possible displacement of the absorption magnitude with respect to the excitation magnitude is selected are provided by combining one of the upper limit values mentioned and one of the lower limits mentioned. In particular, configuration displacements of from 0.01 to 0.5, 0.02 to 0.4, 0.03 to 0.3, 0.04 to 0.25, 0.04 to 0.20 and 0.04 to 0.15 are particularly advantageous.

In a particularly advantageous manner, in a first vibration angle range the substantially constant absorption magnitude is formed and in a second vibration angle range an absorption magnitude which is adapted with respect to the excitation magnitude is formed.

The second vibration angle range advantageously has a larger vibration angle than the first vibration angle range. The second vibration angle range preferably relates to the maximum vibration angle at a or in front of an end stop. In a particularly advantageous manner, the second vibration angle range terminates at a maximum vibration angle. In a particularly advantageous manner, the second vibration angle range begins between 70% and 90% of the maximum vibration angle and advantageously extends up to the end stop, that is to say, 100% of the maximum vibration angle. The adapted absorption magnitude provides an adaptation which continuously increases from a small vibration angle to a larger vibration angle with respect to the excitation magnitude or the resonance. The adapted absorption magnitude can consequently increase or decrease with an increasing vibration angle, that is to say, be formed by an increasing, on average increasing, decreasing or on average decreasing function. The path of the adapted absorption magnitude may in this instance be constructed in different manners. In a particularly advantageous manner, the adapted absorption magnitude provides a substantially linearly increasing or decreasing absorption magnitude. In other words, the adapted magnitude moves away from the excitation magnitude or the resonance so that with large vibration angles an adaptation with respect to the excitation magnitude is provided. If the absorber mass moves with large vibration angles, the excitation is significantly reduced and a stop of the absorber masses on the end stops is thereby prevented or at least significantly damped. The adapted absorption magnitude is advantageously formed by a vibration-angle-dependent function which is monotonous, strictly monotonous or on average monotonous or on average strictly monotonous.

BRIEF DESCRIPTION OF THE DRAWINGS

The torque transmission device is explained in detail below by way of example with reference to a number of Figures, in which.

DETAILED DESCRIPTION OF THE PRESENTLY PREFERRED EMBODIMENTS

Figure 1:
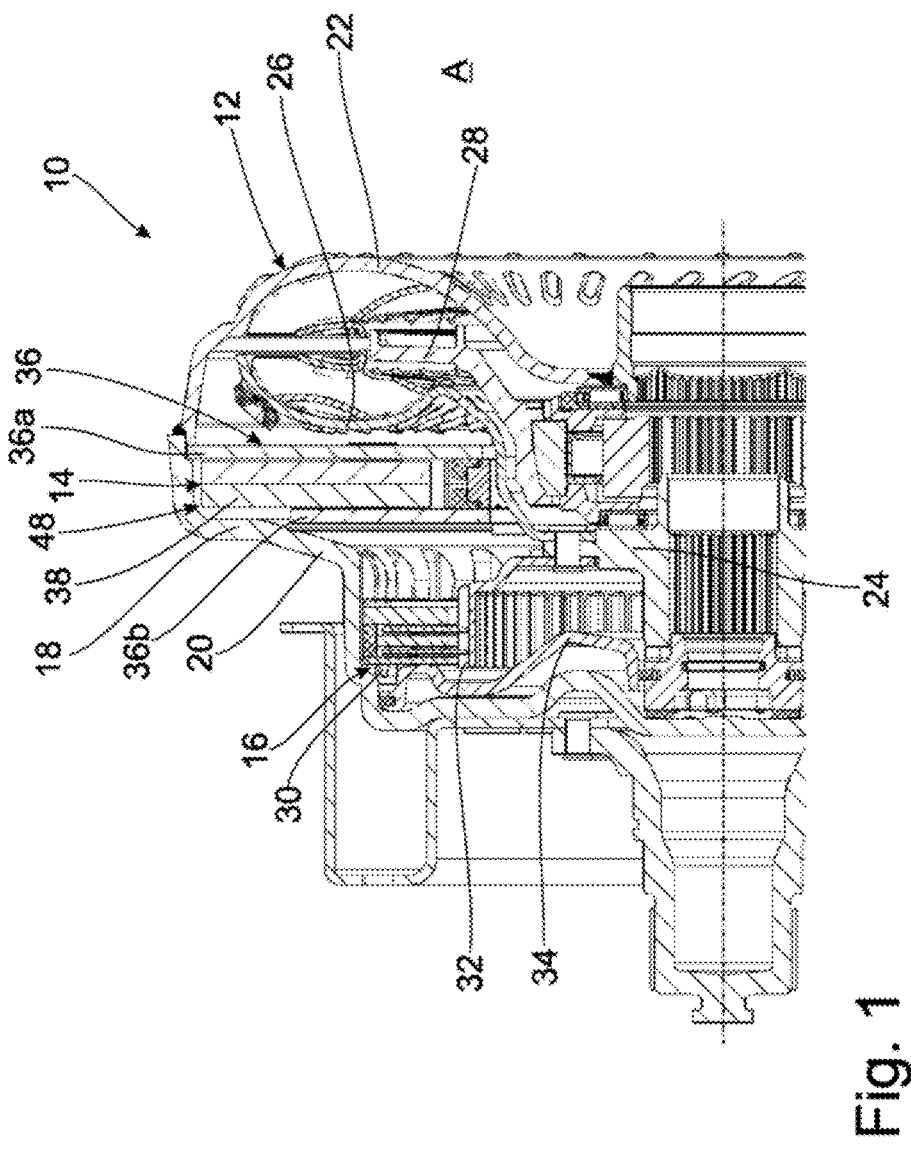
FIG. 1 is a torque transmission device with a speed-adaptive vibration absorber during wet operation.

FIG. 1 shows a torque transmission device 10. The torque transmission device 10 is provided for arrangement in a drive train of a motor vehicle. The torque transmission device 10 can be connected by an input side E to a drive in the form of an internal combustion engine. Furthermore, the torque transmission device 10 can be connected at an output side A to a gear mechanism which is not illustrated. The torque transmission device 10 acts as a force transmission and start-up unit. To this end, the torque transmission device 10 transmits the rotational movement provided by the device to the gear mechanism and provides an absorption of occurrences of irregular rotation of the drive.

The torque transmission device 10 comprises a torque converter 12, a speed-adaptive vibration absorber 14 and a bridging coupling 16. The torque converter 12, the vibration absorber 14 and the bridging coupling 16 are arranged inside a housing 18. The housing is constructed in a fluid-tight manner and at least partially filled with an operating medium, in particular with a gear oil. In this instance, the housing 18 comprises a housing pot-like member 20 and the pump wheel 22. The pump wheel 22 has a sheet portion which forms a part of the housing and pump blades which are constructed on the sheet portion. The housing pot-like member 20 and the pump wheel 22 are arranged axially with respect to each other and securely connected to each other, in particular by a weld connection. The housing pot-like member 20 and the pump wheel 22 are connected to each other in a fluid-tight manner.

The rotational movement of the drive is transmitted to the housing 18 via one or more input elements. The rotational movement which is introduced is then transmitted via the torque converter 12 or the bridging coupling 16 to a hub 24 which is connected in a rotationally secure manner to an input shaft of the gear mechanism. The hub 24 represents the output element.

The torque converter 12 comprises the pump wheel 22, the turbine wheel 26 and the guide wheel 28. During operation, the torque converter 12 is filled with an operating medium, in particular a gear oil, and transmits a rotational movement of the pump wheel 22 to the turbine wheel 26. The operating method of the torque converter is sufficiently known in the prior art and is therefore not explained in greater detail.

The bridging coupling 16 is in the form of a wet-running multi-plate clutch. It comprises an input element 30 in the form of an input plate carrier with input plates which are connected to the housing 18 in a rotationally secure manner. Furthermore, the bridging coupling 16 comprises an output element 32 in the form of an output plate carrier with output plates which are connected to the hub 24 in a rotationally secure manner. In particular, the input plates are arranged in a rotationally secure manner on an input plate carrier which is formed by the housing pot-like member 20 and the output plates are arranged in a rotationally secure manner on the output plate carrier which is securely connected to the hub 24. The input plates and output plates of the bridging coupling 16 are arranged axially one after the other and rotatably with respect to each other. Via an actuation piston 34, the plates can be pretensioned axially with respect to each other so that a frictionally engaging connection is provided. Using the actuation piston 34, the bridging coupling 16 is opened or closed, whereby the torque converter 12 can be bridged by closing the bridging coupling 16.

The vibration absorber 14 comprises an absorber carrier 36 and a plurality of absorber masses 38 which are distributed in a uniform manner in a circumferential direction. The absorber carrier 36 is formed by two absorber carrier sheets 36*a* and 36*b* which are formed axially adjacent to and receive the absorber masses 38 between them. Furthermore, the absorber carrier 36 is secured by the absorber carrier sheet 36*a* to the radially outer circumference on the housing 18. To this end, the housing 18 has axially between the housing pot-like member 20 and the pump wheel 22 on a radially inner region a receiving member for the first absorber carrier sheet 36*a* for securing. The absorber masses 38 are formed by a plurality of individual sheet portions which are arranged axially adjacent to each other. The absorber masses 38 are guided by spherical rollers which cannot be seen in the sectioned image of FIG. 1. The absorber masses 38 and the absorber carrier sheets 36*a* and 36*b* have guide tracks which are associated with each other and in which the spherical rollers engage. The spherical rollers roll along the guide track and provide a vibrating or oscillating movement of the absorber masses 38. In an alternative variant, the absorber carrier may also be constructed centrally, wherein the absorber masses are constructed in several pieces and the components thereof are arranged axially at both sides of the absorber carrier.

Figure 2:
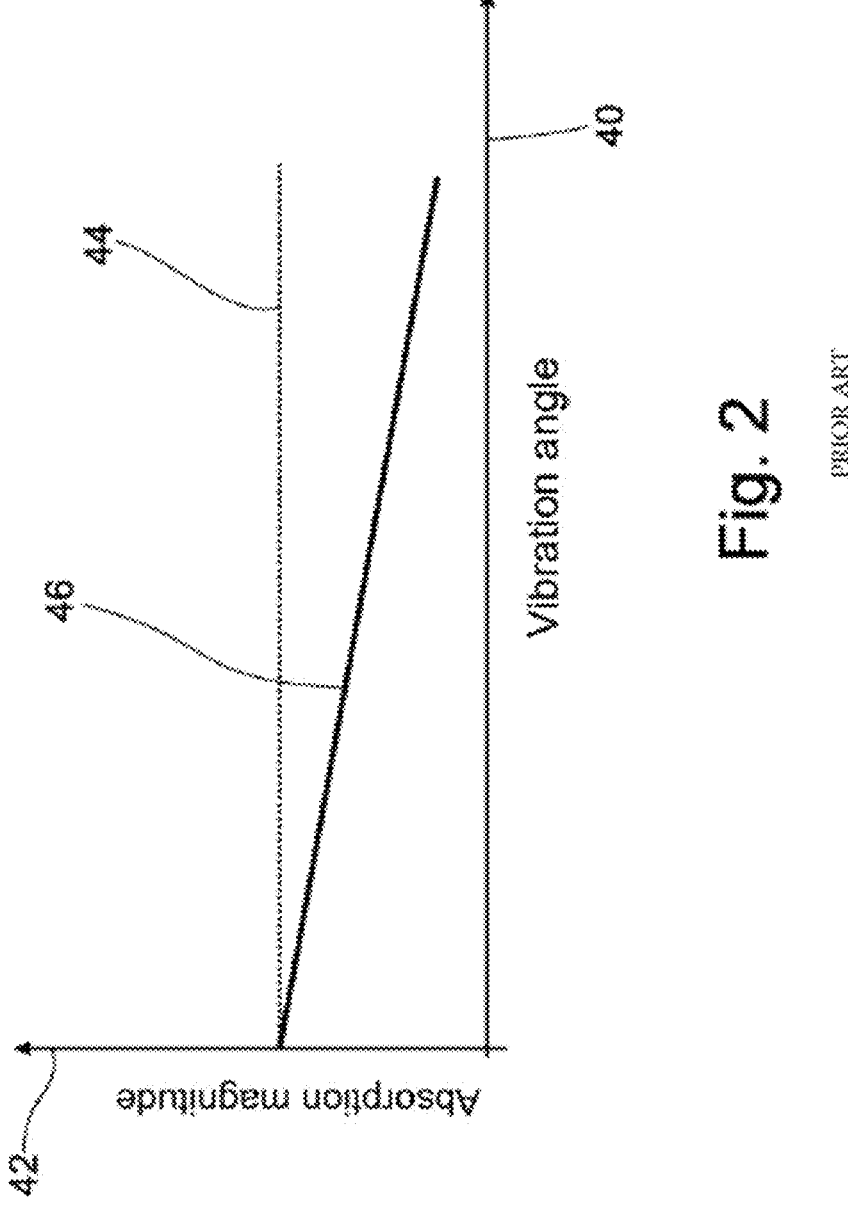
FIG. 2 is a measured absorption magnitude of the speed-adaptive vibration absorber during wet operation with a conventional configuration.

FIG. 2 shows a schematic illustration of the absorption magnitude of the speed-adaptive vibration absorber from the torque transmission device 10 of FIG. 1. The speed-adaptive vibration absorber 14 was constructed according to the conventional configuration rules which compensate for the previously known vibration-angle-independent damping effects of the operating medium. The vibration angle is indicated with respect to the X axis 40, and the absorption magnitude is indicated with respect to the Y axis 42. The line 44 shows the absorption magnitude anticipated according to the previously known configuration rules in the operating state with operating medium. In the known configuration rules, the vibration magnitude displacement by a constant value resulting from damping effects including shearing action and lifting action is taken into account with respect to the operating medium. In tests, however, the absorption magnitude was measured according to the line 46. As can be seen, the provided absorption magnitude of the speed-adaptive absorber unexpectedly decreases as the vibration angle increases.

This decrease of the absorption magnitude is caused by the spatial relationships in the region of the speed-adaptive absorber 14, in particular the absorber masses 38, as shown in FIG. 1. In the radially outer region, in this instance in a radial and in an axial direction comparatively little space 48 in which an operating medium could give way is provided. With a circumferential oscillating movement of the absorber masses 38, corresponding counter-forces occur as a result of the displacement effects. These counter-forces or damping effects are dependent both on the vibration angle, the spatial relationships, the absorption magnitude and the circumferential speed of the absorber masses. The absorption magnitude of the speed-adaptive vibration absorber according to line 46 is inefficient for operation in a motor vehicle and therefore not suitable.

Figure 3:
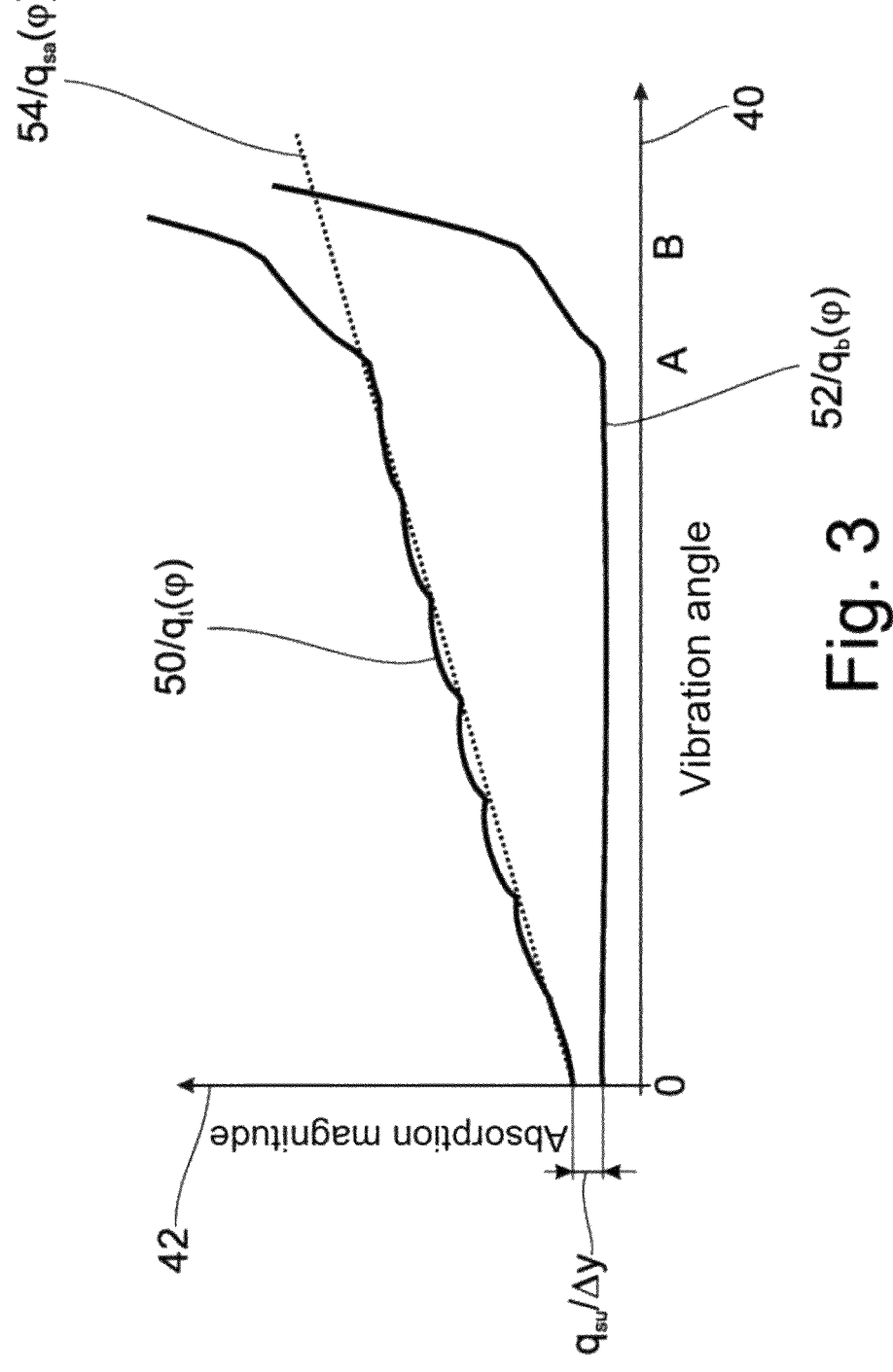
FIG. 3 is an absorption magnitude of the further developed vibration absorber with a new configuration during dry operation and wet operation.

FIG. 3 shows a path of the absorption magnitude of the newly configured speed-adaptive vibration absorber 14 which in addition to the vibration-angle-independent damping effects also takes into account vibration-angle-dependent damping effects. Also in this instance, the vibration angle is illustrated over the X axis 40 and the absorption magnitude is illustrated over the Y axis 42. The Y axis 42 is in this instance standardized to the excitation magnitude of the drive.

According to line 50, the path of the absorption magnitude for the speed-adaptive absorber in the dry operating state is illustrated over the vibration angle. Line 52 shows the path of the absorption magnitude over the vibration angle of the same speed-adaptive absorber in the wet operating state. The line 50 corresponds to the absorption magnitude $q_t(\varphi)$ and the line 52 corresponds to the absorption magnitude $q_b(\varphi)$.

It can be seen that the line 50 has been displaced with respect to the line 52 at a vibration angle 0 by a constant value or by an offset Δy, that is to say, a constant absorption magnitude displacement $q_{su}$. This corresponds to the speed-independent damping effects. In addition, the line 50 increases substantially in a uniform manner or on average in a linear manner over the vibration angle, at least over the first vibration angle range 0 to A. This should be illustrated again by the broken line 54. This broken line 54 corresponds on average to the vibration-angle-dependent damping effects, which become evident as a result of the absorption magnitude displacement $q_{sa}(\varphi)$.

The absorption magnitude displacements $q_{su}$ and $q_{sa}(\varphi)$ are consequently already retained during the configuration for the dry absorption magnitude so that, in a wet operating state, an optimum absorption magnitude close to the excitation magnitude is provided. In particular, $$q_b(\varphi){=}q_t(\varphi){-}q_{su}{-}q_{sa}(\varphi).$$

The constant absorption magnitude in a first vibration angle range 0 to A is offset to a minimal extent with respect to the excitation magnitude of the drive. Corresponding values for the offset of the absorption magnitude may in this instance be derived from the general portion of the description. It can additionally be seen in FIG. 3 that the absorption magnitude according to the line 52 in the range from 0 to A is subjected to small deviations or fluctuations so that the absorption magnitude is on average constant. The illustrated deviations are very small but may also be larger with other speed-adaptive absorbers.

In order to further optimize the absorption magnitude, a constant absorption magnitude is formed only in a first vibration angle range from 0 to A. In a second vibration angle range from A to B, an adapted absorption magnitude is formed. In this end region, at high vibration angles of from A to B, wherein B in this instance describes the maximum vibration angle of the absorber masses, the absorption magnitude of the speed-adaptive vibration absorber increases or is adapted away from the excitation magnitude. In particular, the adapted absorption magnitude increases on average in a linear and strictly monotonous manner. As a result of the displacement or the adaptation of the absorption magnitude away from the excitation absorption magnitude, an optimum damping of the absorber masses in the vibration angle end range is provided. A striking of the absorber masses on an end stop is thereby damped or prevented.

In an alternative variant, the absorption magnitude may also be selected to be below the excitation magnitude. In this instance, in a second vibration angle range from A to B the adapted absorption magnitude decreases accordingly.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torque transmission device comprising:
   a housing that is at least partially filled with an operating medium, formed by an oil;
   a speed-adaptive vibration absorber having an absorber mass, which is arranged inside the housing, wherein the speed-adaptive vibration absorber is configured to compensate for vibration-angle-independent and vibration-angle-dependent damping effects as a result of the operating medium in an operating state,
wherein:

$$q_b(\varphi){=}q_t(\varphi){-}q_{su}{-}q_{sa}(\varphi),$$

wherein:
   $q_t(\varphi)$ is an absorption magnitude of the speed-adaptive vibration absorber during operation without the operating medium,
   $q_b(\varphi)$ is an absorption magnitude during operation with the operating medium,
   $q_{su}$ is a constant absorption magnitude displacement and is substantially constant, and
   $q_{sa}(\varphi)$ is a function that is dependent on the vibration angle of the absorber mass.

2. The torque transmission device as claimed in claim 1, wherein the absorption magnitude $q_t(\varphi)$ is dependent on a vibration angle of the absorber mass and during operation with the operating medium has an absorption magnitude $q_b(\varphi)$, and wherein $q_t(\varphi)$ and $q_b(\varphi)$ differ by an absorption magnitude displacement which is independent of the vibration angle and an absorption magnitude displacement which is dependent on the vibration angle.

3. The torque transmission device as claimed in claim 1, wherein the speed-adaptive vibration absorber provides a substantially constant absorption magnitude in the operating state with the operating medium over at least a portion, in particular over a majority, of an entire vibration angle of the absorber mass.

4. The torque transmission device as claimed in claim 2, wherein the absorption magnitude is displaced with respect to an excitation magnitude, in particular by a value from 0.01 to 0.5.

5. The torque transmission device as claimed in claim 1, characterized in that in a first vibration angle range (0 to A) a substantially constant absorption magnitude is formed and in a second vibration angle range an absorption magnitude which is adapted with respect to an excitation magnitude is formed.

* * * * *